US010922030B2

(12) United States Patent
Tsuji et al.

(10) Patent No.: US 10,922,030 B2
(45) Date of Patent: Feb. 16, 2021

(54) IMAGE FORMING APPARATUS AND NON-TRANSITORY COMPUTER READABLE MEDIUM

(71) Applicant: FUJI XEROX CO., LTD., Tokyo (JP)

(72) Inventors: Tsunaki Tsuji, Yokohama (JP); Masanori Shiba, Yokohama (JP); Junichiro Jimbo, Yokohama (JP); Takayuki Nakao, Yokohama (JP); Satoshi Hanamura, Yokohama (JP); Ligang Liao, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 143 days.

(21) Appl. No.: 16/001,982

(22) Filed: Jun. 7, 2018

(65) Prior Publication Data

US 2018/0364954 A1   Dec. 20, 2018

(30) Foreign Application Priority Data

Jun. 14, 2017   (JP) .................................. 2017-116861

(51) Int. Cl.
  *G06F 3/12* (2006.01)
  *G06K 15/00* (2006.01)

(52) U.S. Cl.
  CPC .......... *G06F 3/1204* (2013.01); *G06F 3/1205* (2013.01); *G06F 3/1255* (2013.01); *G06F 3/1258* (2013.01)

(58) Field of Classification Search
  None
  See application file for complete search history.

(56) References Cited

U.S. PATENT DOCUMENTS

| 2002/0059318 A1 | 5/2002 | Nomura et al. |
| 2015/0371126 A1* | 12/2015 | Ota .................. G06K 15/408 358/1.14 |

FOREIGN PATENT DOCUMENTS

| JP | 9-48165 | 2/1997 |
| JP | 2003-34061 | 2/2003 |
| JP | 2006-346943 | 12/2006 |

OTHER PUBLICATIONS

Abstract and machine translation of JP 9-48165.
Abstract and machine translation of JP 2006-346943.

* cited by examiner

*Primary Examiner* — Dov Popovici
(74) *Attorney, Agent, or Firm* — Fildes & Outland, P.C.

(57) ABSTRACT

There is provided an image forming apparatus. A reception unit receives a change of a printing setting for each page in a case where, in a printing setting is designated for printing data that is made up of a plurality of pages, a page on which printing processing is impossible to perform is included in the printing data. An output unit outputs the printing data according to the printing setting that is received by the reception unit.

15 Claims, 17 Drawing Sheets

FIG. 5
PRINTING DATA EXAMPLE
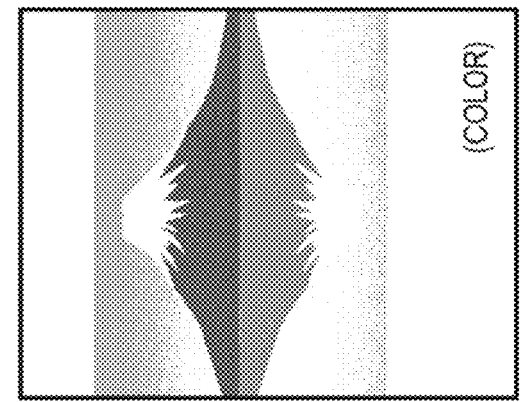
FIRST PAGE
(MONOCHROME, A4)
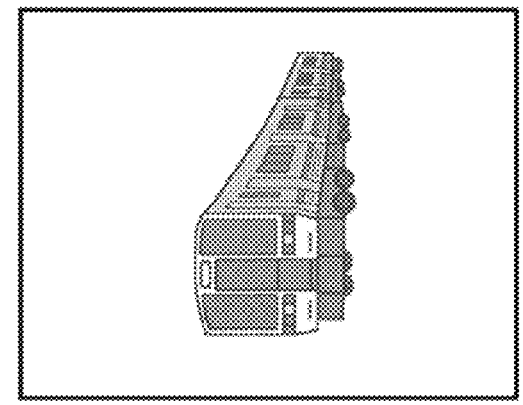
SECOND PAGE
(COLOR, A4)
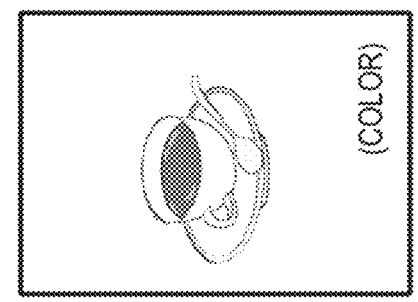
THIRD PAGE
(MONOCHROME, B4)
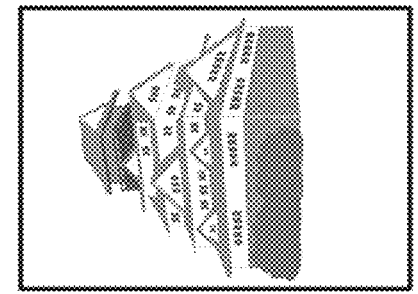
FOURTH PAGE
(COLOR, B4)

FIG. 8

EXAMPLE OF INQUIRY SCREEN FOR USER

PROCESSING FOR PAGE THAT IS IMPOSSIBLE
TO PRINT AS DESIGNATED

IMAGE OF ORIGINAL COPY (COLOR) → PRINTING IMAGE (MONOCHROME)

SECOND PAGE IN FILE NAME: ooo.html
CANNOT BE PRINTED AS DESIGNATED

COLOR PRINTING IS IMPOSSIBLE
(DESIGNATION IN PRINTING JOB: COLOR PRINTING)

PLEASE SELECT ONE OF THE FOLLOWING
AS PROCESSING METHOD FOR PAGE

○ DELETE PAGE

○ REPLACE PAPER SHEET FOR PAGE WITH BLANK PAPER SHEET

○ REPLACE PAPER SHEET FOR PAGE WITH INSERTING PAPER SHEET

◉ PERFORM CHANGING TO PRINTING SETTING IN WHICH PRINTING IS POSSIBLE (COLOR → MONOCHROME)

○ PERFORM CHANGING TO PRINTING SETTING IN WHICH PRINTING IS POSSIBLE AND OFFSET CHANGED PAGE (COLOR → MONOCHROME)

○ CANCEL ALL PRINTING JOBS

DESIGNATION TARGET

◉ ONLY THIS PAGE

○ THIS PAGE AND SUBSEQUENT PAGES

[DETERMINATION]

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-116861 filed on Jun. 14, 2017.

BACKGROUND

Technical Field

The disclosure relates to an image forming apparatus and a non-transitory computer readable medium.

SUMMARY

According to an aspect of the invention, there is provided an image forming apparatus comprising: a reception unit that receives a change of a printing setting for each page in a case where, in the printing setting is designated for printing data that is made up of a plurality of pages, a page on which printing processing is impossible to perform is included in the printing data; and an output unit that outputs the printing data according to a printing setting that is received by the reception unit.

BRIEF DESCRIPTION OF THE DRAWINGS

Exemplary embodiments of the present invention will be described in detail based on the following figures, wherein:

FIG. 5 is a diagram illustrating an example of printing data that is used when describing an example of a printing processing operation;

FIG. 8 is a diagram illustrating an example of an inquiry screen for inquiring the processing method for the page that is impossible to print of the user;

DETAILED DESCRIPTION

Next, exemplary embodiments of the present invention will be described in detail below with reference to the drawings.

Figure 1:
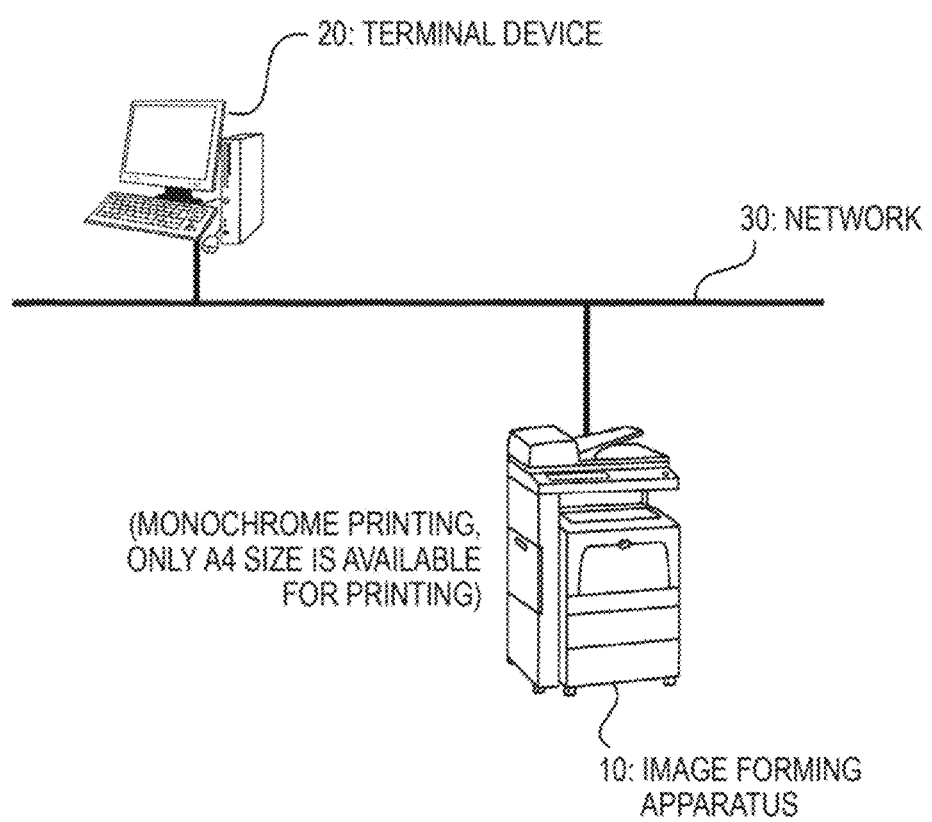
FIG. 1 is a diagram illustrating a configuration of a printing system including an image forming apparatus 10 according to an exemplary embodiment of the present invention.

FIG. 1 is a diagram illustrating a configuration of a printing system including an image forming apparatus 10 according to an exemplary embodiment of the present invention.

An image forming system according to an exemplary embodiment of the present invention, as illustrated in FIG. 1, is configured with the image forming apparatus 10 and a terminal device 20 that are connected with each other through a network 30. The terminal device 20 generates printing data, and transmits the generated printing data to the image forming apparatus 10 through the network 30. The image forming apparatus 10 receives the printing data that is transmitted from the terminal device 20, and outputs an image in accordance with the printing data on a paper sheet. It is noted that the image forming apparatus 10 is an apparatus that is referred to as a so-called multifunction machine which has plural functions, such as a printing function, a scanning function, a copying function, and a facsimile function.

At this point, the image forming apparatus 10 according to the present exemplary embodiment is described as supporting only monochrome printing, and not as supporting color printing. It is noted that, this holds true even in a case where the image forming apparatus 10 supports a color printing function, and even in a case where, in an authority setting, a user who gives an instruction to perform printing processing does not have the authority to perform the color printing and can perform only the monochrome printing.

Furthermore, the image forming apparatus 10 is described as being able to perform printing on only a paper sheet that has an A4 size or smaller and not as being able to perform printing on a paper sheet that has a size larger than the A4 size, such as a B4 size or an A3 size.

Figure 2:
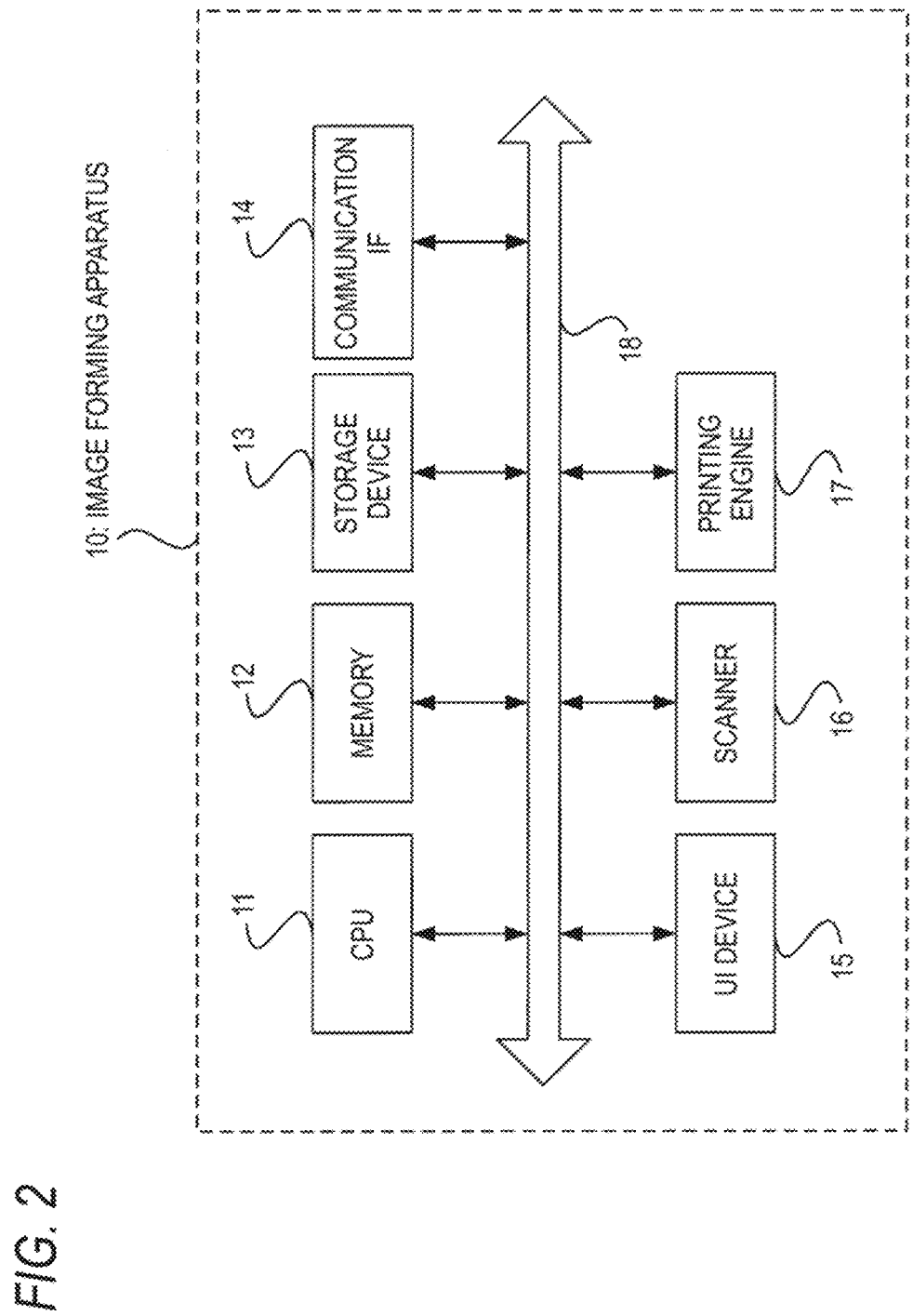
FIG. 2 is a block diagram illustrating a hardware configuration of the image forming apparatus 10 according to an exemplary embodiment of the present invention.

Next, FIG. 2 illustrates a hardware configuration of the image forming apparatus 10 in the image forming system according to the present exemplary embodiment.

The image forming apparatus 10, as illustrated in FIG. 2, has a CPU 11, a memory 12, a storage device 13 such as a hard disk (HDD), a communication interface (IF) 14 that performs transmission and reception of data between an external device and the like through the network 30, a user interface (UI) device 15 that includes a touch panel or a liquid crystal display, and a keyboard, a scanner 16, and a printing engine 17. These constituent elements are connected to each other through a control bus 18.

The printing engine 17 prints an image on a recording medium, such as a paper sheet for printing, via processing, such as charging, exposure, development, transfer, and fixing.

The CPU 11 performs predetermined processing based on a control program that is stored in the memory 12 or the storage device 13, and thus controls operation of the image forming apparatus 10.

It is noted that in the present exemplary embodiment, the CPU 11 is described as reading the control program, which is stored within the memory 12 or the storage device 13, for execution, but the program is possibly stored in the recording medium, such as a CD-ROM, in order to be provided to the CPU 11.

Figure 3:
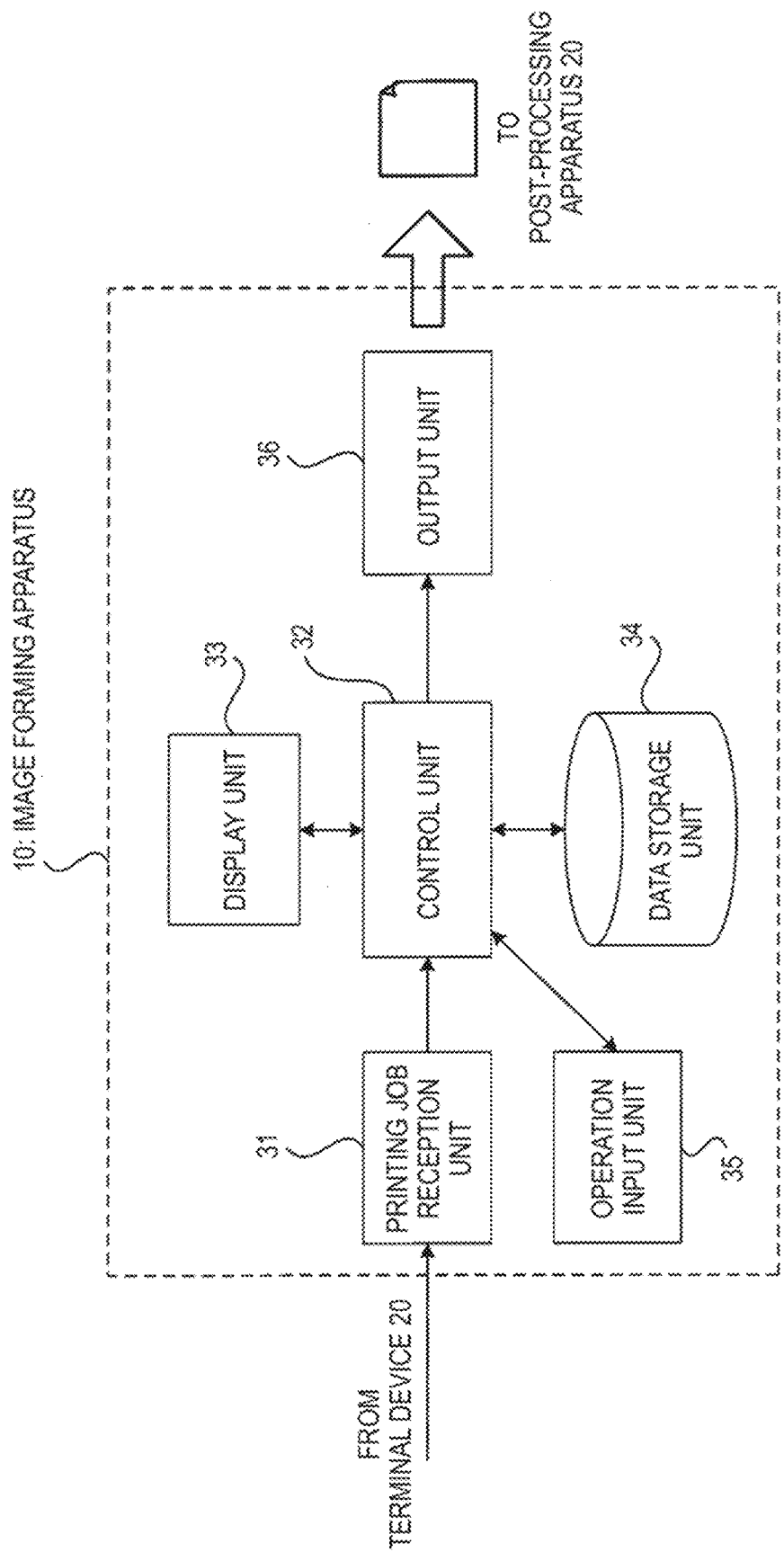
FIG. 3 is a block diagram illustrating a functional configuration of the image forming apparatus 10 according to an exemplary embodiment of the present invention.

FIG. 3 is a block diagram illustrating a functional configuration of the image forming apparatus 10, which is realized by executing the control program described above.

The image forming apparatus 10 according to the present exemplary embodiment, as illustrated in FIG. 3, includes a printing job reception unit 31, a control unit 32, a display unit 33, a data storage unit 34, an operation input unit 35, and an output unit 36.

The printing job reception unit 31 receives a printing job (printing data) that is transmitted from a terminal device 20.

The control unit 32 generates image data for printing, based on the printing job that is received by the printing job reception unit 31, and performs control that outputs the generated image data from the output unit 36. The data storage unit 34 is configured with a non-volatile storage device, such as a flash memory or a HDD, and the printing data that is generated by the control unit 32. Various pieces of data, such as printing device information indicating a printing setting in which the printing processing is possibly performed in the image forming apparatus 10 are stored in the data storage unit 34.

The display unit 33 is controlled by the control unit 32 and various pieces of information are displayed on the display unit 33 for the user. The operation input unit 35 inputs pieces of information on various operations that are performed by the user.

The output unit 36 outputs an image on the recording medium, such as a paper sheet for printing, under the control of the control unit 32.

Furthermore, in a case where, in the printing setting that is designated for the printing data that is made up of plural pages, a page on which the printing processing is impossible to perform is included in the printing data, the control unit 32 receives a change in a printing setting for each page.

For example, the control unit 32 displays an inquiry screen on the display unit 33, and thus inquires a printing setting (e.g. pre-printing setting) for the page on which the printing processing is impossible to perform, of a user and receives a printing setting (e.g. sub-printing setting) that is input from the user through the operation input unit 35, as the printing setting for the printing data.

Then, the control unit 32 changes a printing setting for a page that is impossible to print to the received printing setting, generates an image data in a raster pattern, controls the output unit 36 based on the generated image data, and performs the printing processing. For this reason, the output unit 36 outputs the printing data according to the printing setting that is received by the control unit 32.

It is noted that, without inputting from the operation input unit 35 a printing setting making a change to the printing processing for the page that is impossible to print, the printing setting for the page on which the printing setting is impossible to perform may be registered in advance with the data storage unit 34.

In this case, the control unit 32 receives the printing setting that is registered with the data storage unit 34, as the printing setting for the page on which the printing processing is impossible to perform.

Figure 4:
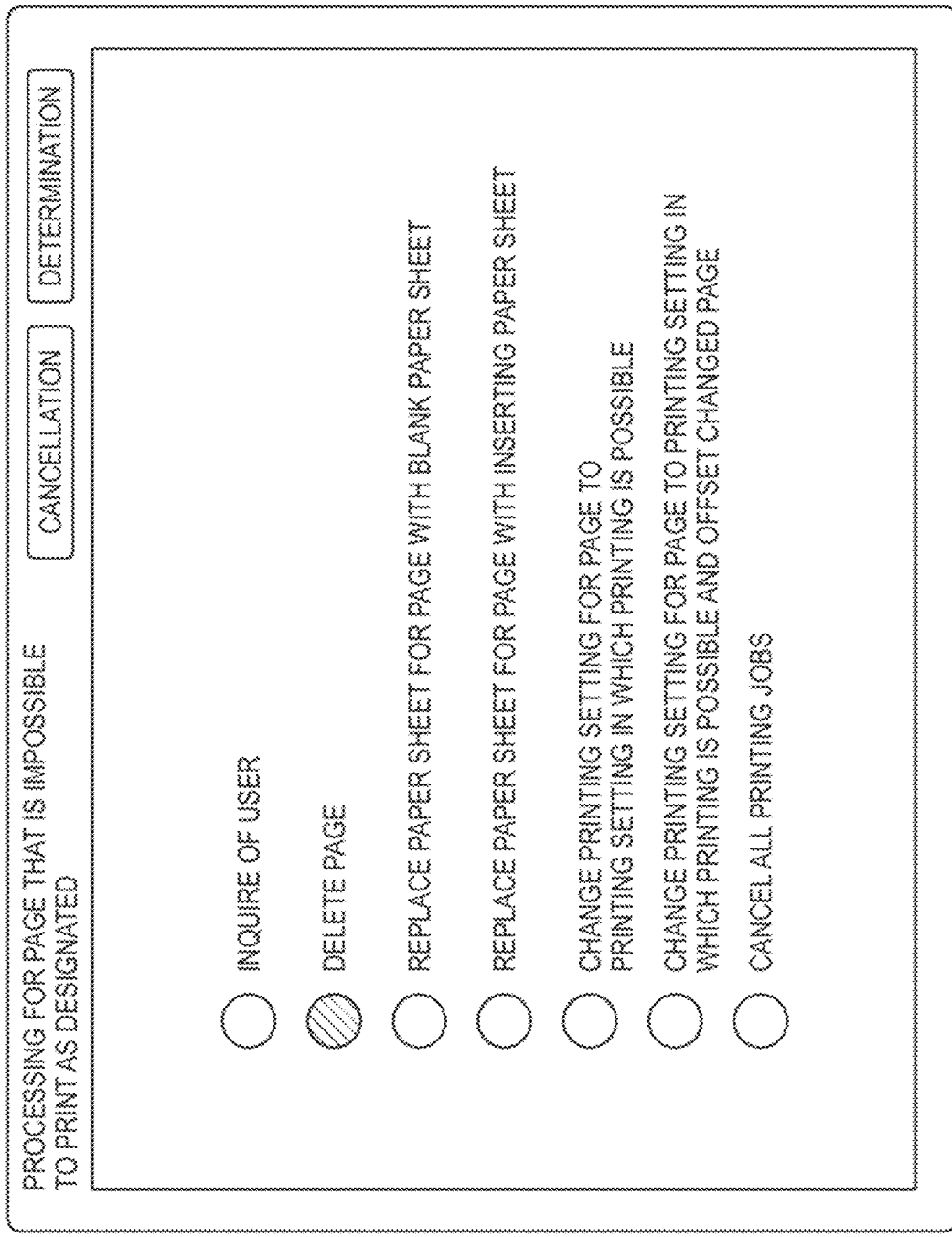
FIG. 4 is an example of a display screen that is displayed when a processing method for a page that is impossible to print is in advance input from a user.

For example, a screen as illustrated in FIG. 4 is displayed on the display unit 33, and thus a processing method for the page that is impossible to print as designated is input in advance from the user and the processing method that is input is registered, as the printing setting making a change for the page that is impossible to print, with the data storage unit 34.

In a case where there is a page that is impossible to print, from a screen that is illustrated in FIG. 4, a selection can be made among from "INQUIRE OF USER", "DELETE PAGE", "REPLACE PAPER SHEET FOR PAGE WITH BLANK PAPER SHEET", "REPLACE PAPER SHEET FOR PAGE WITH INSERTING PAPER SHEET, CHANGE PRINTING SETTING FOR PAGE TO PRINTING SETTING IN WHICH PRINTING IS POSSIBLE", "CHANGE PRINTING SETTING FOR PAGE TO PRINTING SETTING IN WHICH PRINTING IS POSSIBLE AND OFFSET CHANGED PAGE", and "CANCEL ALL PRINTING JOBS".

It is noted that as a printing setting for a page on which the printing processing is impossible, which is input by the user through the operation input unit 35, or a printing setting for a page on which the printing processing is impossible, which is registered in advance with the data storage unit 34, there are present a printing setting for deleting the page and a printing setting for replacing a paper sheet for the page with a designated paper sheet, such as a blank paper sheet or an inserting paper sheet that is a paper sheet that is different in type from paper sheets for other pages.

Additionally, regarding the printing setting for the page on which the printing processing is impossible to perform, a printing setting for changing the printing setting for that page to a printing setting in which the printing processing is possibly performed can be provided. For example, in a case where the image forming apparatus 10 cannot perform the color printing, the printing setting for the page for which the color printing is designated is changed to a printing setting for the monochrome printing, and in a case where only the printing up to an A4 size can be performed, a printing setting for a page for which an A3 size paper sheet is designated is changed to a printing setting for an A4 size paper sheet.

It is noted that in a case where the printing setting is changed in this way, the output unit 36 may output the page for which the printing setting is changed to a position that is different from a position of a page for which a printing setting is not changed, in such a manner that the page for which the printing setting is changed is distinguished. For example, the output unit 36 causes a position of the page, for which the printing setting is changed, to be offset through shifting in a direction that is orthogonal to an output direction of the page for which the printing setting is not changed, for output.

Furthermore, the output unit 36 outputs the page for which the printing setting is changed, by outputting an image on a paper sheet of which a paper sheet direction is different from that of a paper sheet for the page for which the printing setting is not changed. For example, the output unit 36 prints the page for which the printing setting is not changed, on an A4 paper sheet in the vertical direction, and prints the page for which the printing setting is changed, on an A4 paper sheet in the horizontal direction.

Next, operation of the image forming apparatus 10 according to the present exemplary embodiment is described in detail with reference to the drawings.

It is noted that in the following description, in order to specifically describe the operation of the image forming apparatus 10, a case is described in which, as illustrated in FIG. 5, the printing processing is performed based on the printing data.

An example of the printing data in FIG. 5 is configured with 4 pages. In a printing setting for the first page, the monochrome printing is possible, and a size of a paper sheet is A4. In a printing setting for the second page, the color printing is possible, and the size of a paper sheet is A4. In a printing setting for the third page, the monochrome printing is possible, and the size of a paper sheet is B4. In a printing setting for the fourth page, the color printing is possible, and the size of a paper sheet is B4. Furthermore, images of the first page and the third page are monochrome images, and images of the second page and the fourth page are color images. It is noted that regarding the color image, the color image is indicated by inserting the letters "color" into the image.

For this reason, in the image forming apparatus in which only the monochrome printing is possibly performed and the size of a paper sheet up to an A4 size is available for printing, the printing processing for the first page is possible performed, but the printing processing for second to fourth pages are impossible to perform.

Figure 6:
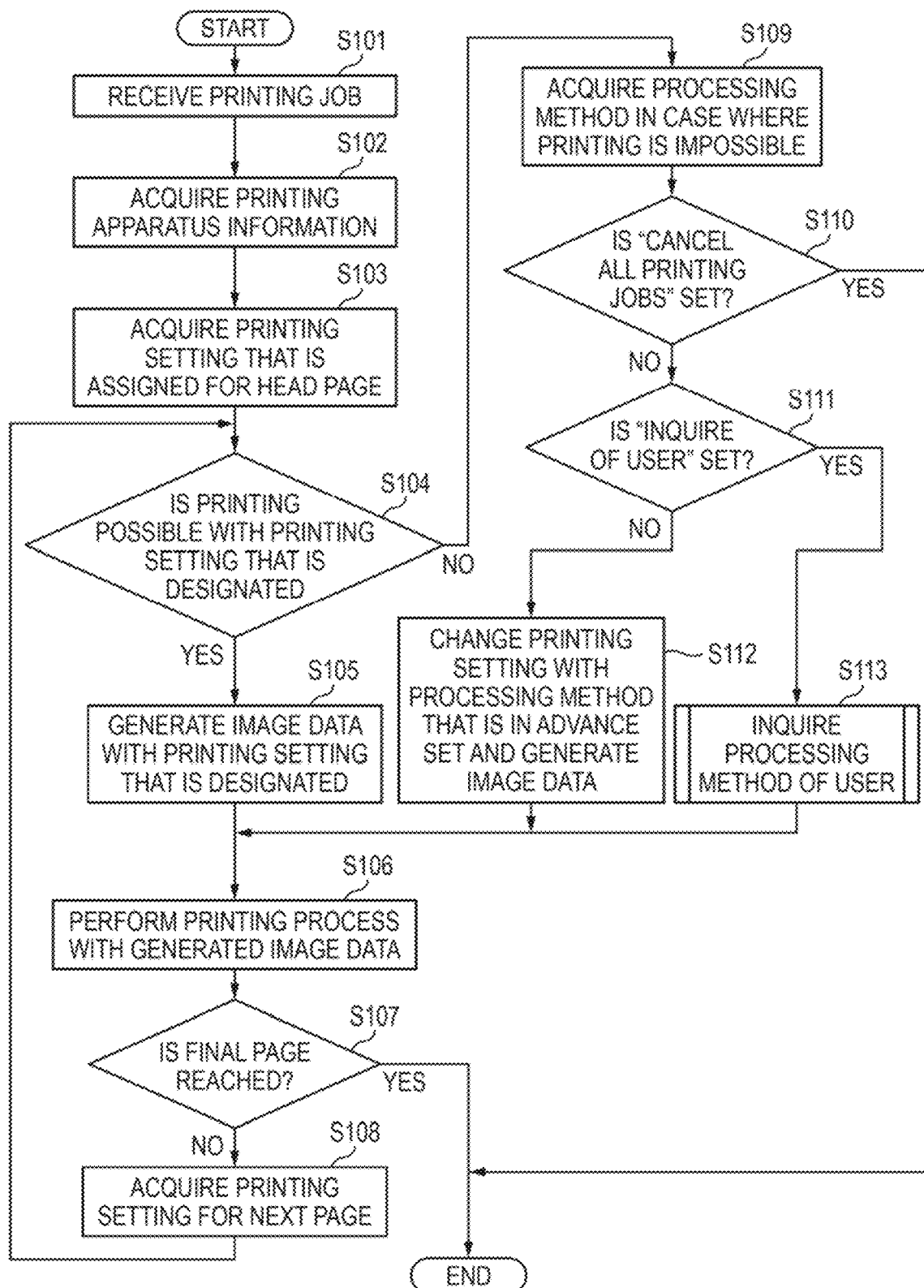
FIG. 6 is a flowchart for describing the printing processing operation in the image forming apparatus 10 according to an exemplary embodiment of the present invention.

Next, a printing processing operation in the image forming apparatus 10 according to the present exemplary embodiment is described with reference to a flowchart in FIG. 6.

First, when the printing job is transmitted from the terminal device 20, the printing job is received in the printing job reception unit 31 (Step S101). When this is done, the control unit 32 acquires the printing device information, which is stored in the data storage unit 34, as information for determining whether or not the printing is possible with the printing setting for each page in the received printing job (Step S102).

At this point, not only pieces of information (the monochrome printing/color printing, and the size of a paper sheet that is available for the printing) relating to a function of the image forming apparatus 10, but also pieces of information relating to the presence and absence of a malfunction, states of consumables, such as a toner, a state of paper feeding of the paper sheet, and the like are included in the printing device information.

Then, the control unit 32 acquires information of a printing setting that is designated for a head page in the first-received printing job (Step S103), and determines whether the printing is possible with the designated printing setting (Step S104).

Then, in a case where it is determined that due to a current state in the image forming apparatus 10, the printing is possible with the designated printing setting (yes in Step S104), the control unit 32 generates image data of the page based on the designated printing setting (Step S105).

Then, the control unit 32 performs the printing processing by controlling the output unit 36 based on the generated image data (Step S106).

Then, if the page on which the printing processing is performed is a final page (no in Step S107), the control unit 32 acquires information of a printing setting for a next page (Step S108), and reiterates the processing in Step S104.

The processing in each of Steps S104 to S108 is reiterated, and thus the printing processing of each page is sequentially performed unless the printing is impossible with the printing setting for each page is.

However, in a case where it is determined that the printing is not possible with a printing setting that is designated for a certain page (no in Step S104), the control unit 32 acquires a processing method in a case where the page that is impossible to print is present, from the data storage unit 34 (Step S109).

At this point, in a case where the processing method that is registered is "CANCEL ALL PRINTING JOBS" (yes in Step S110), more precisely, in a case where "CANCEL ALL PRINTING JOBS" is set on a setting screen as illustrated in FIG. 4, the control unit 32 cancels the printing job to end the processing.

Furthermore, in a case where the processing method that is registered is neither "CANCEL ALL PRINTING JOBS, nor "INQUIRE OF USER" (no in Step S111), the control unit 32 changes the printing setting for the page that is impossible to print with the processing method that is registered in advance, and generates the image data (Step S112).

It is noted that changes of the printing setting here include not only a change of the color printing to the monochrome printing or a change of the size of a paper sheet for printing from B4 to A4, but also output of a paper sheet, such as a blank paper sheet without performing the printing processing of the page, or deletion of the paper sheet without performing the output of the page.

Then, in a case where the processing method that is registered is not "CANCEL ALL PRINTING JOBS" and is "INQUIRE OF USER" (yes in Step S111), the control unit 32 inquires the processing method for the page that is impossible to print of the user, and changes the printing setting for the page that is impossible to print, using the processing method that is input by the user (Step S113).

Figure 7:
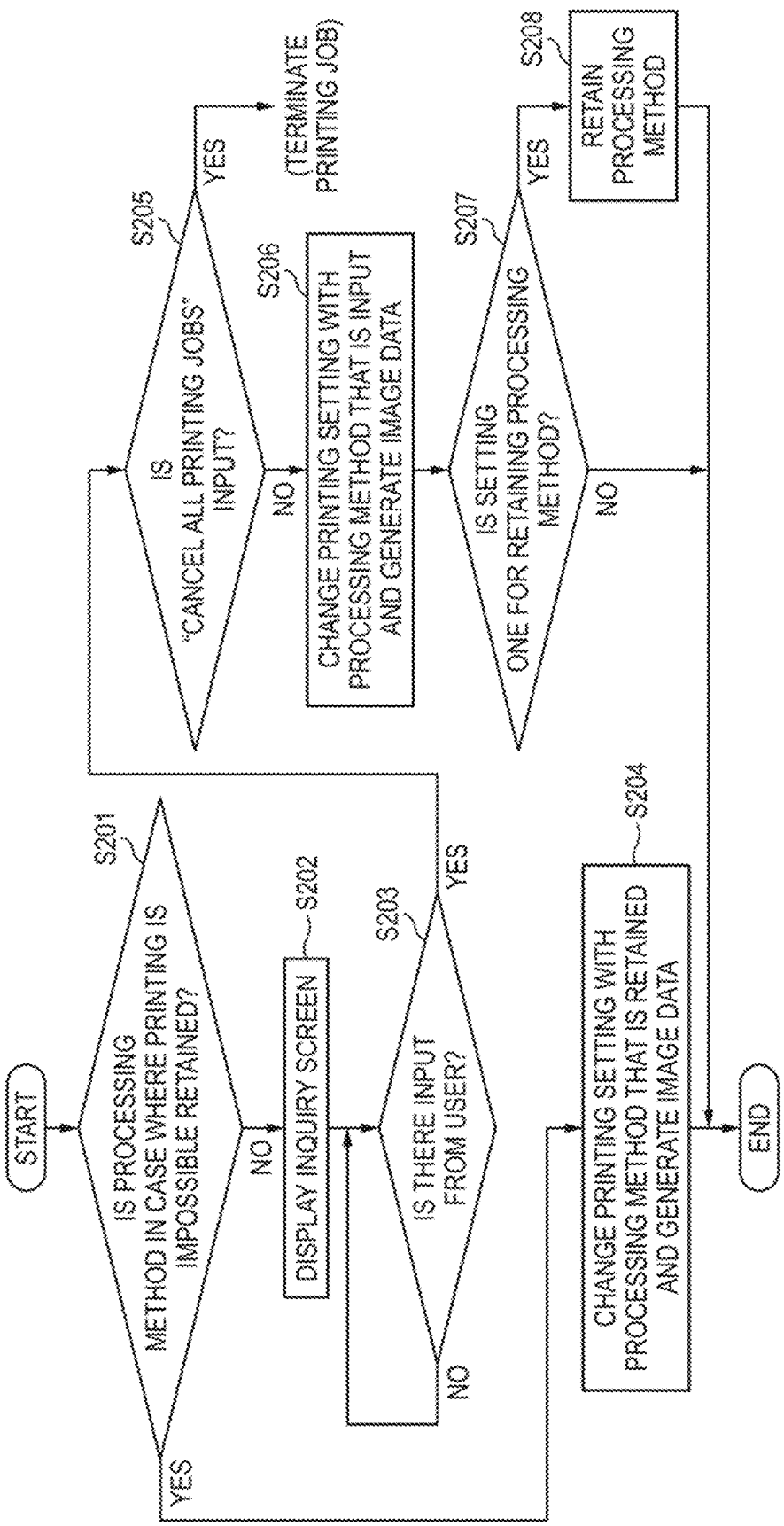
FIG. 7 is a flowchart for describing processing (Step S113) that inquires the processing method for the page that is impossible to print of the user.

Processing that inquires the processing method for the page that is impossible to print of the user is described in detail with reference to a flowchart in FIG. 7.

First, the control unit 32 determines whether or not a processing method that is set in such a manner that a processing method that is input for a certain page is also applied in the same way to the next page and subsequent pages is retained as the processing method for the page that is impossible to print (Step S201).

It is noted that because this processing method is not retained here (no in Step S201), the control unit 32 is described as displaying the inquiry screen for the user (Step S202).

Figure 9:
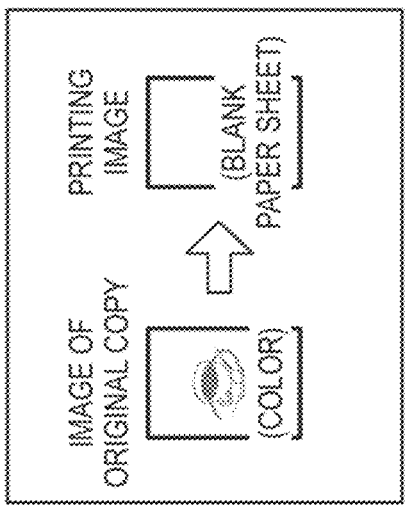
FIG. 9 is a diagram illustrating an example of the inquiry screen for inquiring the processing method for the page that is impossible to print of the user.
Figure 10:
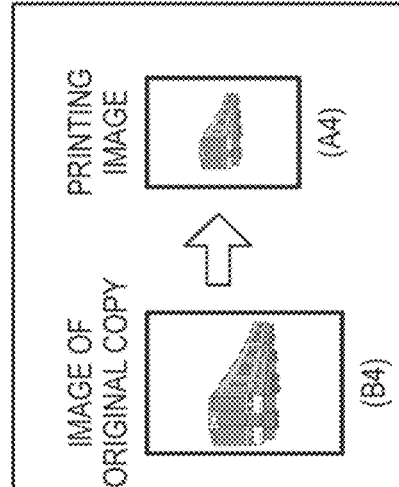
FIG. 10 is a diagram illustrating an example of the inquiry screen for inquiring the processing method for the page that is impossible to print of the user.

An example of the inquiry screen is displayed in this way is illustrated in FIGS. 8 to 10.

FIG. 8 illustrates a case that is an example of the inquiry screen for the second page in the example of the printing data that is illustrated in FIG. 5, and in which the user selects the processing method "PERFORM CHANGING TO PRINTING SETTING WITH WHICH PRINTING IS POSSIBLE (COLOR→MONOCHROME).

More precisely, a case is illustrated in which because the printing setting before the printing setting is changed is for the color printing and thus the printing processing is impossible to perform, the user selects changing of the printing setting to a printing setting in which the monochrome printing is possible.

It is noted that in FIG. 8, "ONLY THIS PAGE" is designated as a designation target page, and the condition that application of the selected processing method is only to a current page is selected.

Furthermore, FIG. 9 illustrates a case that is the example of the inquiry screen for the second page in the example of the printing data that is illustrated in FIG. 5, and in which the user selects the processing method "REPLACE PAPER SHEET FOR PAGE WITH BLANK PAPER SHEET".

More precisely, a case is illustrated in which because the printing setting before the printing setting is changed is for the color printing and thus the printing processing is impossible to perform, the user selects replacement with a blank paper sheet without performing the printing processing of the page.

It is noted that in FIG. 9, "THIS PAGE AND ALL SUBSEQUENT PAGES" is designated as a designation target page, and the condition that application of the selected processing method is only to a current page and all subsequent pages are selected. More precisely, in a case where this selection is made, even if the third page and subsequent pages are impossible to print, the printing setting is changed by a processing method in which replacement with a blank paper sheet that is selected in the second page is performed without inquiring of the user and thus the printing processing is performed.

Furthermore, FIG. 10 illustrates a case that is an example of the inquiry screen for the third page in the example of the printing data that is illustrated in FIG. 5, and in which the user selects the processing method "PERFORM CHANGING TO PRINTING SETTING WITH WHICH PRINTING IS POSSIBLE (B4→A4).

More precisely, a case is illustrated in which because the size of a paper sheet in the printing setting before changing the printing setting is B4 and thus the printing processing is impossible to perform, the user selects changing of the size of a paper sheet for the page to A4 performing of the printing processing.

Then, when the processing method for the page that is impossible to print is input on this inquiry screen (yes in Step S203), the control unit 32 changes the printing setting for the page that is impossible to print, based on the processing method that is input.

Specifically, in a case where the processing method that is input is "CANCEL ALL PRINTING JOBS" (yes in Step S205), the control unit 32 cancels the performing of the printing job to end the processing.

Furthermore, in a case where the processing method that is input is other than "CANCEL ALL PRINTING JOBS" (no in Step S205), the control unit 32 changes the printing setting for the page that is impossible to print, using the processing method that is input, and generates the image data (Step S206).

Then, in a case where a setting in which the processing method that is input is also applied to the next page and subsequent pages is provided (yes in Step S207), the control unit 32 retains the processing method in the data storage unit 34 (Step S208).

Furthermore, in a case where a setting in which the processing method that is input is also applied to the next page and subsequent pages is not provided (no in Step S207), the control unit 32 ends processing that inquires the processing method of the user.

It is noted that in a case where the processing method that is also applied to the next page and subsequent pages in this way (yes in Step S201), the control unit 32 changes the printing setting for the page that is impossible to print, using the processing method that is retained, and generates the image data (Step S204).

An example of a result of the printing that is output by performing this processing that changes the printing setting is illustrated in FIGS. 11 to 18.

Figure 11:
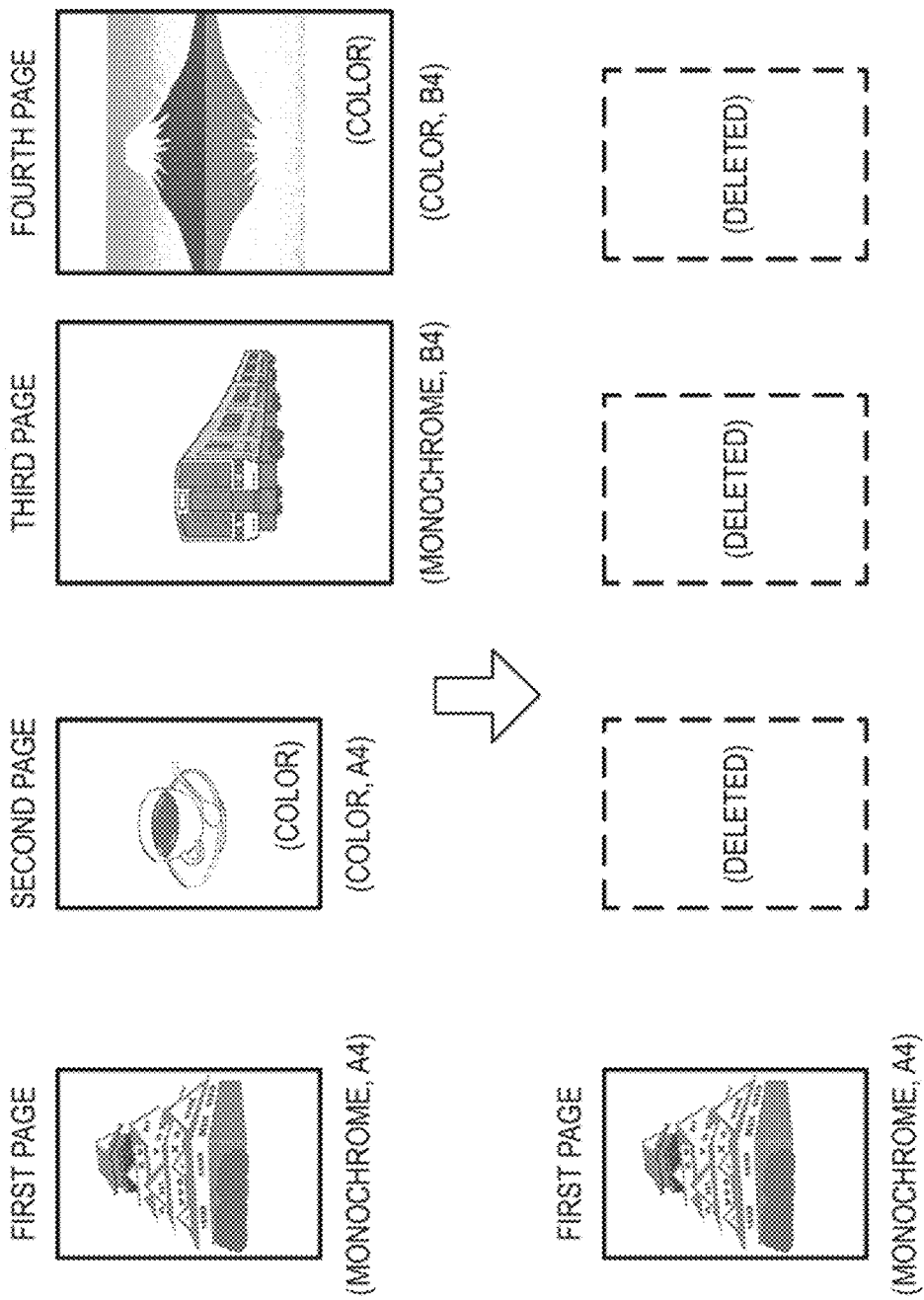
FIG. 11 is a diagram illustrating an example of a result of printing, which is output by performing processing that changes a printing setting.

FIG. 11 is an example of a result of the printing in a case where "DELETE PAGE (PAGE THAT IS IMPOSSIBLE TO PRINT) is selected in an example of display as illustrated in FIG. 4. When referring to FIG. 11, it is understood that the second to fourth pages, of which the printing is the coloring printing that is impossible to perform in the image forming apparatus 10, and for which the printing setting designates a B4 size of a paper sheet, are deleted.

Figure 12:
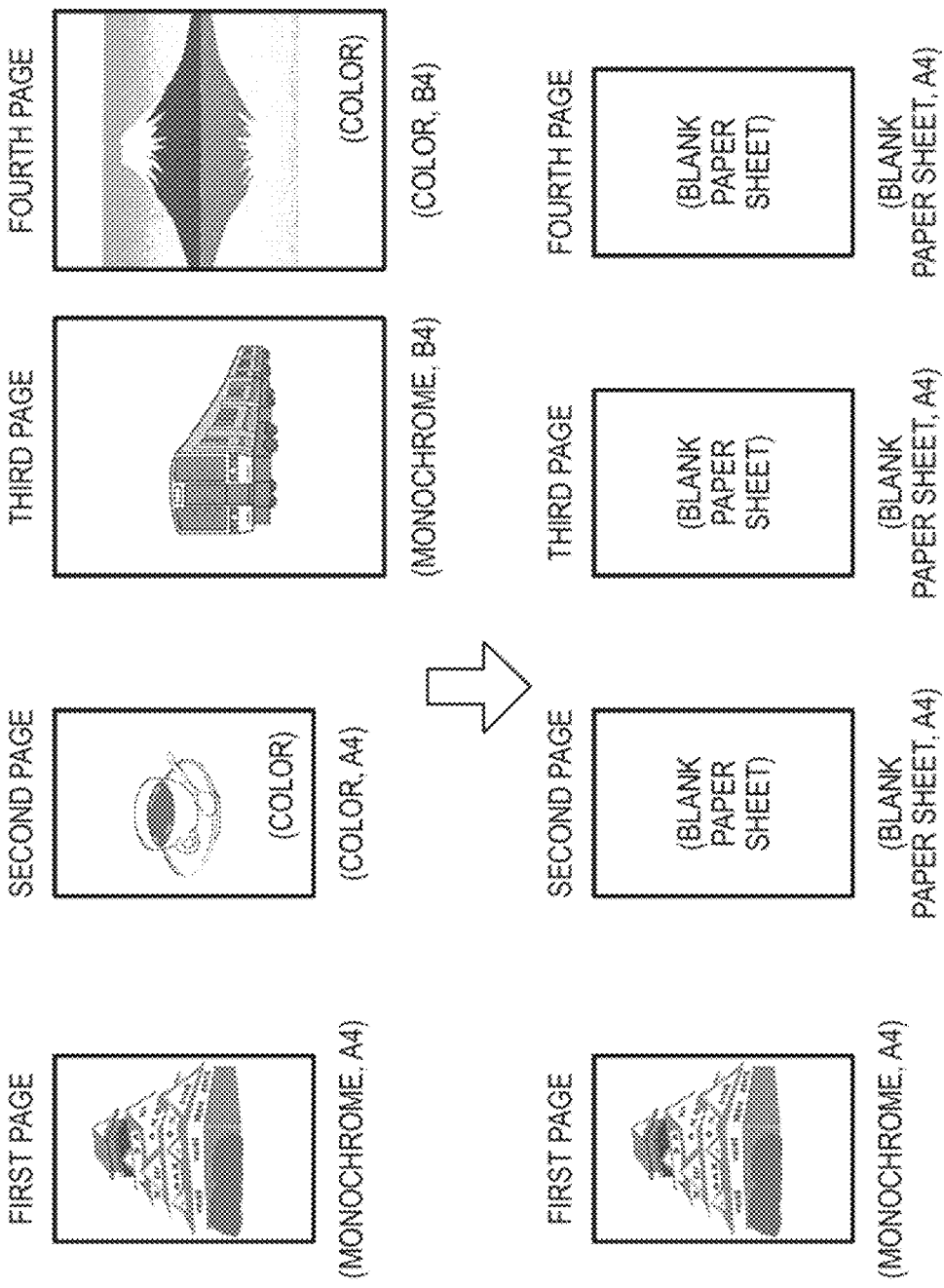
FIG. 12 is a diagram illustrating an example of the result of printing, which is output by performing processing that changes the printing setting.

FIG. 12 is an example of a result of the printing in a case where "REPLACE PAPER SHEET FOR PAGE (WHICH IS IMPOSSIBLE TO PRINT) WITH BLANK PAPER SHEET" is selected in the example of display as illustrated in FIG. 4. When referring to FIG. 12, it is understood that a paper sheet for the second to fourth pages, of which the printing is the coloring printing that is impossible to perform in the image forming apparatus 10, and for which the printing setting designates a B4 size of a paper sheet, are replaced with blank paper sheets.

Figure 13:
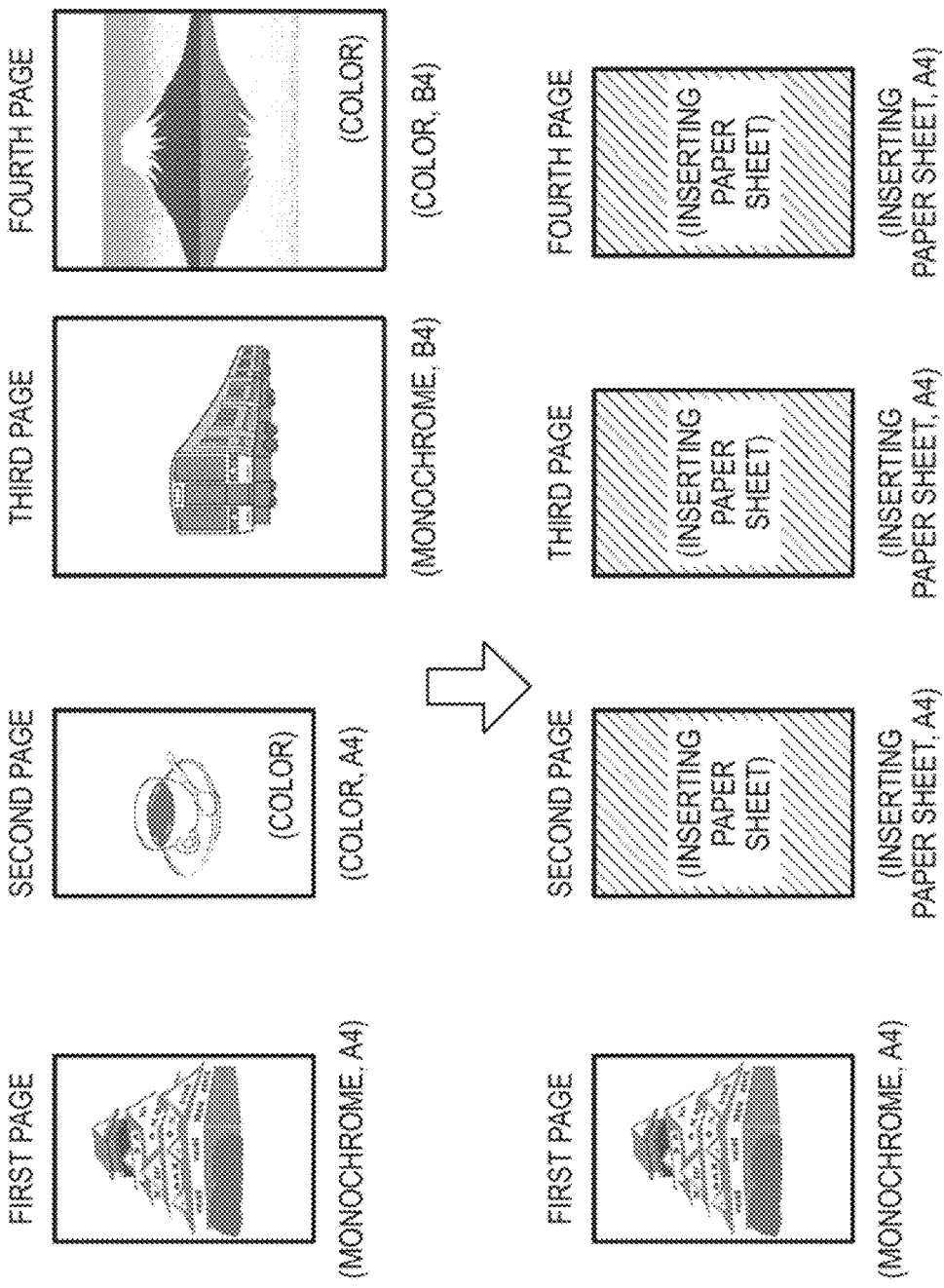
FIG. 13 is a diagram illustrating an example of the result of printing, which is output by performing processing that changes the printing setting.

FIG. 13 is an example of a result of the printing in a case where "REPLACE PAPER SHEET FOR PAGE (WHICH IS IMPOSSIBLE TO PRINT) WITH INSERTING PAPER SHEET" is selected in the example of display as illustrated in FIG. 4. When referring to FIG. 13, it is understood that the paper sheet for the second to fourth pages, of which the printing is the coloring printing that is impossible to perform in the image forming apparatus 10, and for which the printing setting designates the B4 size of a paper sheet, are replaced with inserting paper sheets.

Figure 14:
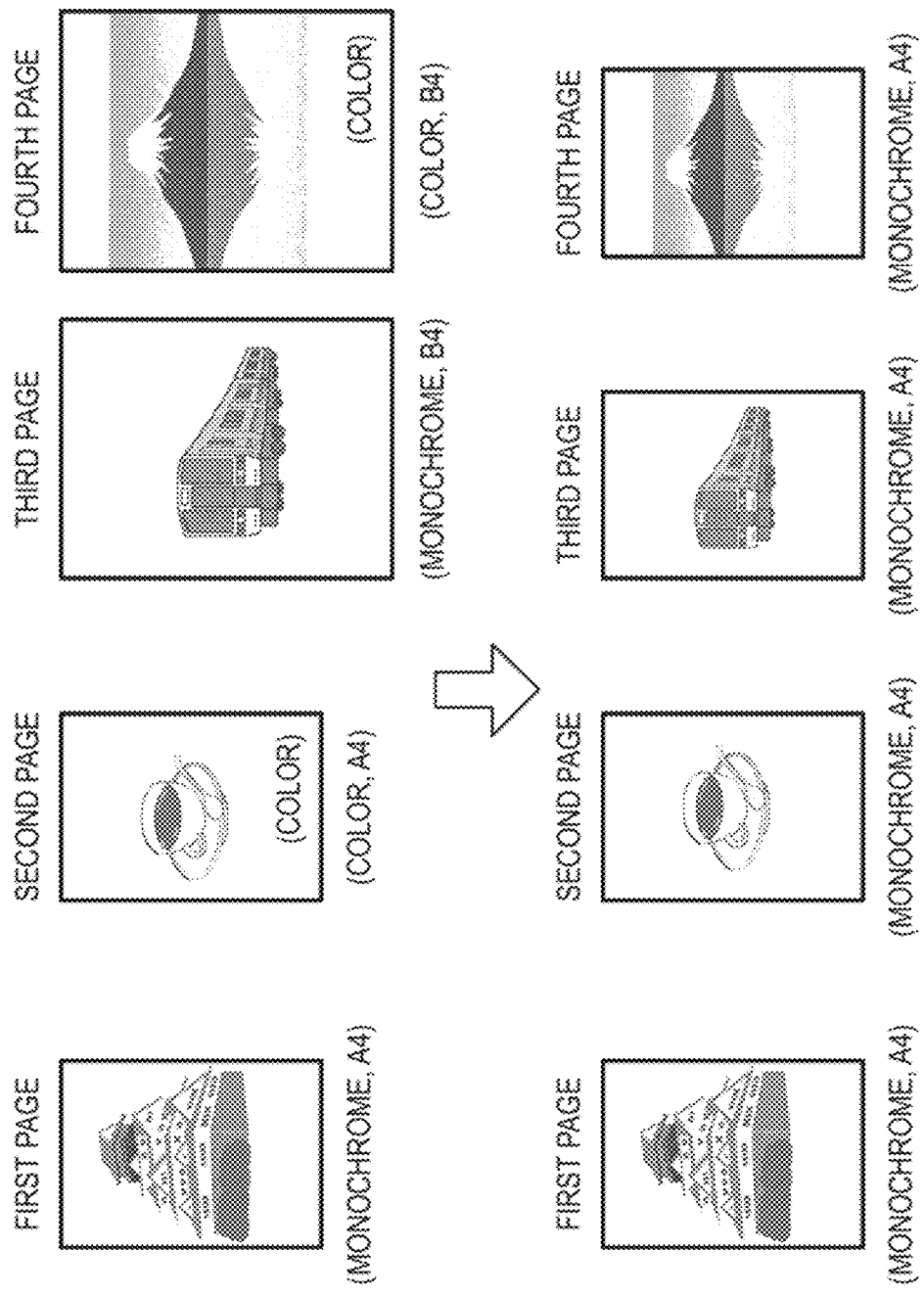
FIG. 14 is a diagram illustrating an example of the result of printing, which is output by performing processing that changes the printing setting.

FIG. 14 is an example of a result of the printing in a case where "CHANGE PRINTING SETTING FOR PAGE (WHICH IS PAGE THAT IS IMPOSSIBLE TO PRINT) TO PRINTING SETTING IN WHICH PRINTING IS POSSIBLE" is selected in the example of display as illustrated in FIG. 4. When referring to FIG. 14, it is understood that the color printing of the paper sheet for the second to fourth pages, which is impossible to perform in the image forming apparatus 10, and the B4 size of a paper sheet, which is designated in the printing setting for the second to fourth pages, are changed to the monochrome printing and an A4 size of a paper sheet, respectively.

Figure 15:
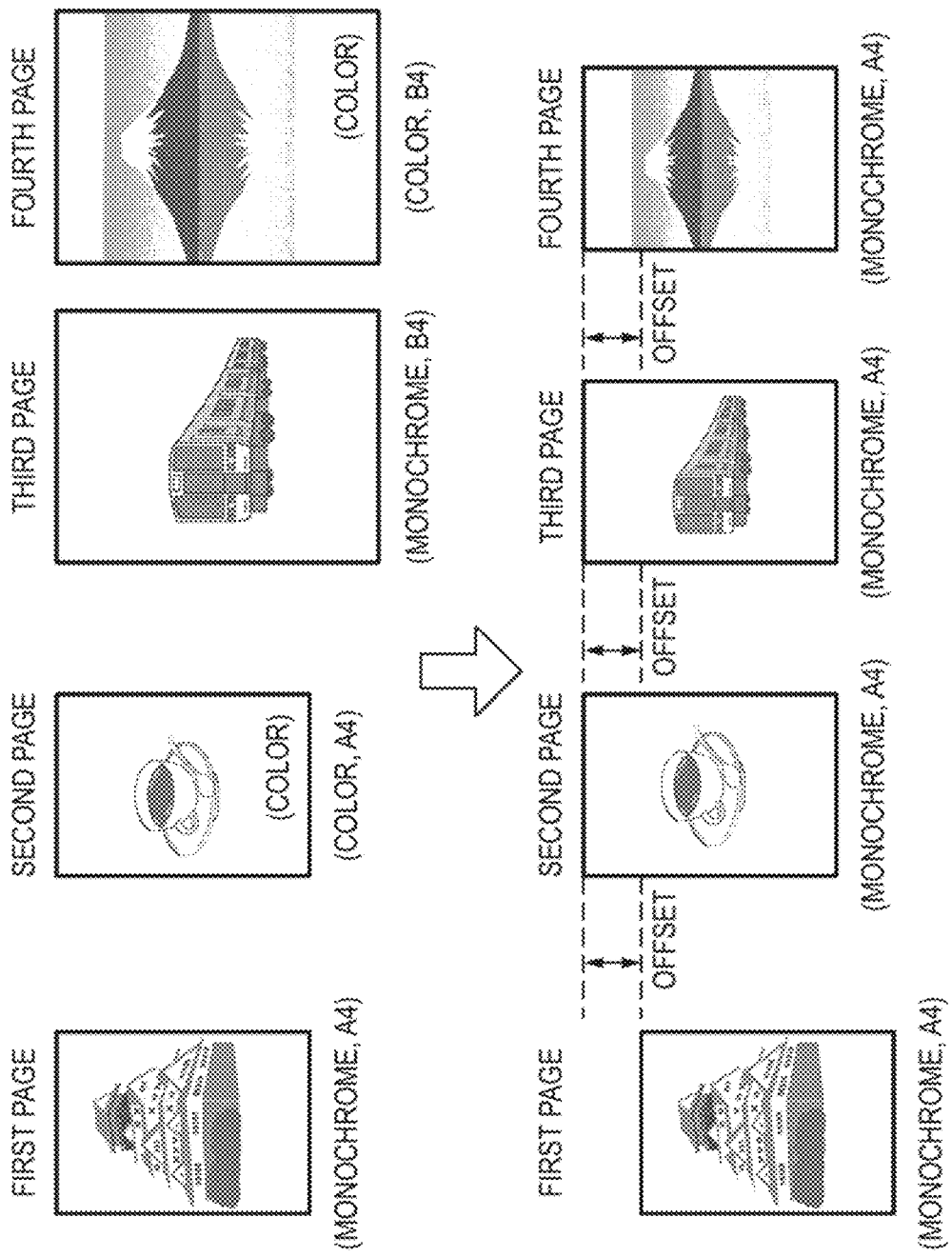
FIG. 15 is a diagram illustrating an example of the result of printing, which is output by performing processing that changes the printing setting.

FIG. 15 is an example of a result of the printing in a case where "CHANGE PRINTING SETTING FOR PAGE (WHICH IS PAGE THAT IS IMPOSSIBLE TO PRINT) TO PRINTING SETTING IN WHICH PRINTING IS POSSIBLE AND OFFSET CHANGED PAGE" is selected in the example of display as illustrated in FIG. 4. When referring to FIG. 15, it is understood that the color printing of the paper sheet for the second to fourth pages, which is impossible to perform in the image forming apparatus 10, and the B4 size of a paper sheet, which is designated in the printing setting for the second to fourth pages, are changed to the monochrome printing and the A4 size of a paper sheet, respectively, and are offset for output.

Figure 16:
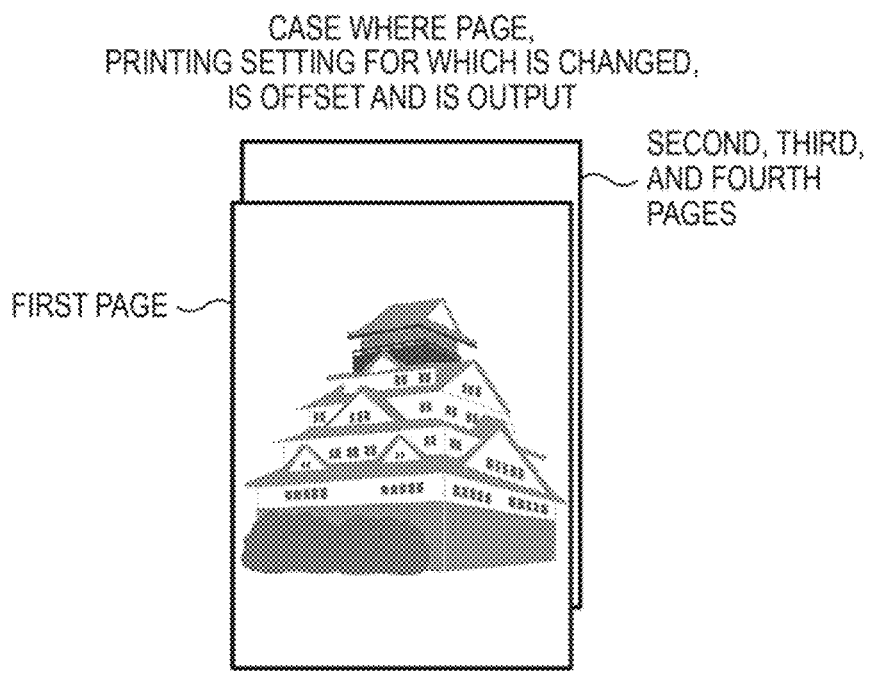
FIG. 16 is a diagram illustrating an example of the result of printing, which is output by performing processing that changes the printing setting.

An aspect of a result of the output in a case where the page for which the printing setting is changed is offset for output is illustrated in FIG. 16. When referring to FIG. 16, it is understood that the second to fourth pages for which the printing settings are offset and are output to positions different from that of the first page.

Figure 17:
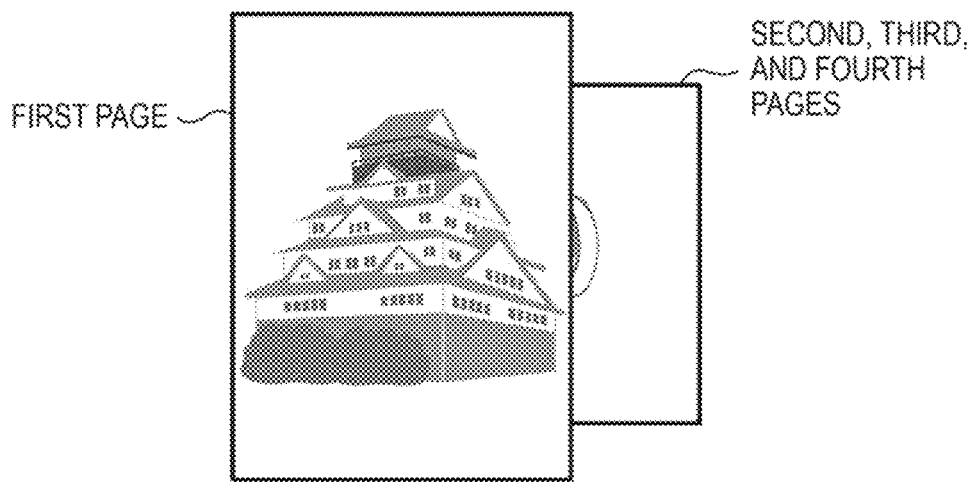
FIG. 17 is a diagram illustrating an example of the result of printing, which is output by performing processing that changes the printing setting.

Furthermore, the aspect of the result of output in a case where the page for which the printing setting is changed is output on a paper sheet of which a direction is different from the paper sheet direction is illustrated in FIG. 17. When referring to FIG. 17, the second to fourth pages for which the printing settings are changed are printed on paper sheets, and the first page for which the printing setting is not changed is printed the A4 paper sheet in the vertical direction, and thus it is understood that the page for which the printing setting is changed can be easily distinguished.

Figure 18:
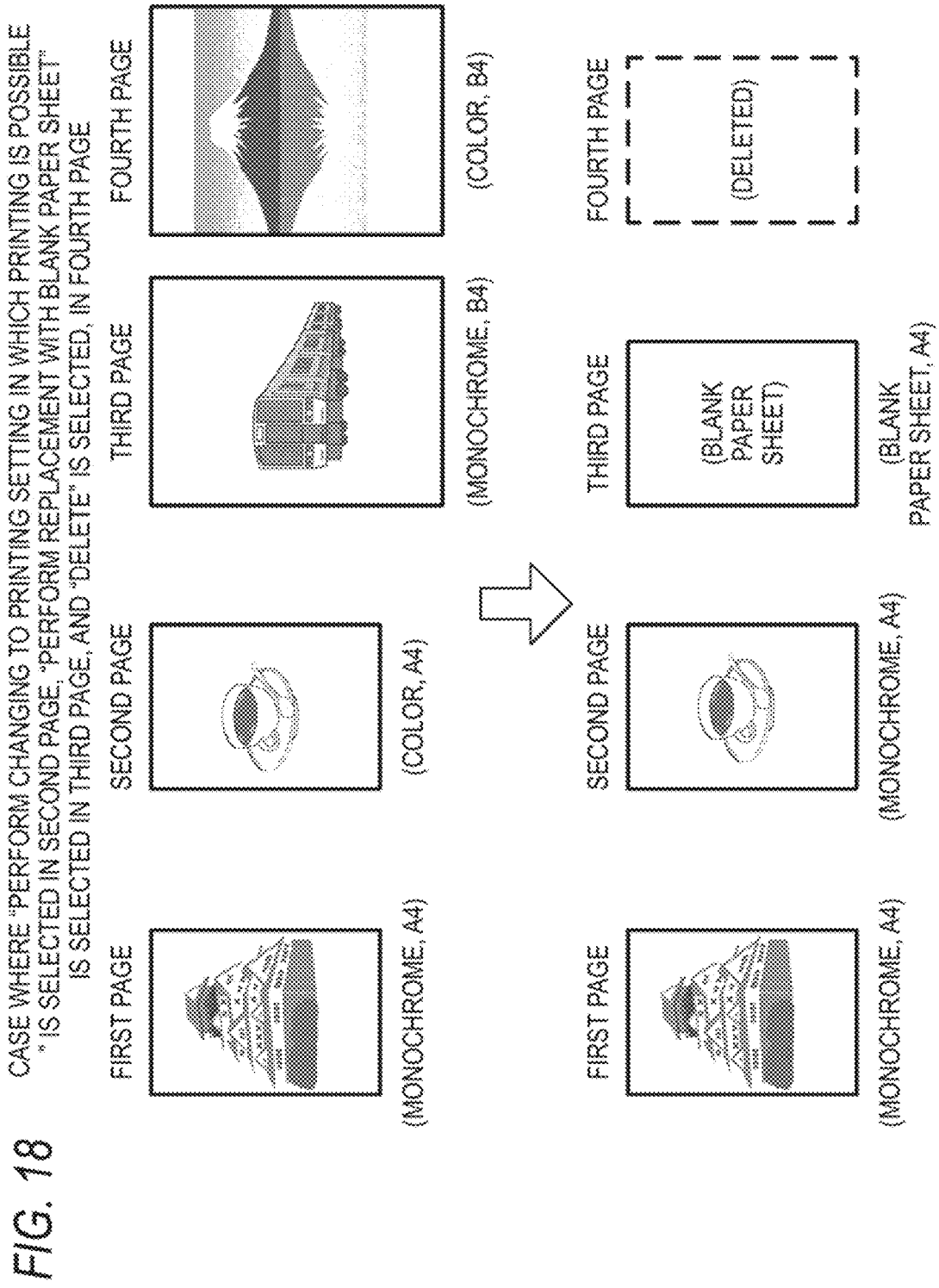
FIG. 18 is a diagram illustrating an example of the result of printing, which is output by performing processing that changes the printing setting.

Lastly, an example of a result of the printing in a case where "INQUIRE OF USER" is selected in the example of display as illustrated in FIG. 4 and where a processing method that varies with each page that is impossible to print is selected through inquiry screens as illustrated in FIGS. 8 to 10 is illustrated in FIG. 18.

A case where "PERFORM CHANGING TO PRINTING SETTING IN WHICH PRINTING IS POSSIBLE" is selected in the second page, where "PERFORM REPLACEMENT WITH BLANK PAPER SHEET" is selected in the third page, and where "DELETE" is selected in the fourth page is illustrated in FIG. 18.

When referring to FIG. 18, it is understood that the color printing in the printing setting is changed to the monochrome printing in the second page, that the B4 size of a paper sheet in the printing setting is changed to the A4 size of a paper sheet in the third page, and that the color printing and the B4 size of a paper sheet in the printing setting are changed to the monochrome printing and the A4 size of a paper sheet, respectively, in the fourth page.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising a processor that is configured to:
   inquire a user to change a printing setting for each page on which printing processing is impossible to perform in the printing setting designated for printing data that is made up of a plurality of pages, in a case where the plurality of pages includes the page on which printing processing is impossible to perform;
   receive an instruction to change the printing setting for the page on which printing processing is impossible to perform; and
   output the printing data of the page on which printing processing is impossible to perform according to the printing setting that is changed based on the received instruction.

2. The image forming apparatus according to claim 1, wherein the processor is further configured to:
   register in advance a printing setting for the data on which the printing processing is impossible to perform, and
   receive the registered printing setting as the printing setting for a page on which the printing processing is impossible to perform.

3. The image forming apparatus according to claim 2, wherein a printing setting for the page on which the printing processing is impossible to perform is a printing setting for deleting the page.

4. The image forming apparatus according to claim 2, wherein a printing setting for the page on which the printing processing is impossible to perform is the printing setting for replacing a paper sheet for the page with a paper sheet that is designated.

5. The image forming apparatus according to claim 2, wherein a printing setting for the page on which the printing processing is impossible to perform is the printing setting for changing the printing setting for the page to a printing setting in which the printing processing is possibly performed.

6. The image forming apparatus according to claim 1, wherein a printing setting for the page on which the printing processing is impossible to perform is a printing setting for deleting the page.

7. The image forming apparatus according to claim 1, wherein a printing setting for the page on which the printing processing is impossible to perform is the printing setting for replacing a paper sheet for the page with a paper sheet that is designated.

8. The image forming apparatus according to claim 7, wherein the paper sheet with which the paper sheet for the page on which the printing processing is impossible to perform is replaced with a blank paper sheet.

9. The image forming apparatus according to claim 7, wherein the paper sheet with which the paper sheet for the page on which the printing processing is impossible to perform is replaced ((is)) with a paper sheet that is different in type from paper sheets for other pages.

10. The image forming apparatus according to claim 1, wherein a printing setting for the page on which the printing processing is impossible to perform is the printing setting for changing the printing setting for the page to a printing setting in which the printing processing is possibly performed.

11. The image forming apparatus according to claim 10, wherein the processor is further configured to output a page for which a printing setting is changed, to a position that is different from that of a page for which a printing setting is not changed.

12. The image forming apparatus according to claim 11, wherein the processor is further configured to shift a position of the page, for which the printing setting is changed, in a direction that is orthogonal to an output direction of the page, for which the printing setting is not changed, for output.

13. The image forming apparatus according to claim 11, wherein the processor is further configured to output an image of the page for which the printing setting is changed, on a paper sheet of which a paper sheet direction is different from that of the page for which the printing setting is not changed, for output.

14. A non-transitory computer readable medium that causes a computer to perform:
   inquiring a user to change a printing setting for each page on which printing processing is impossible to perform in the printing setting designated for printing data that is made up of a plurality of pages, in a case where the plurality of pages includes the page on which printing processing is impossible to perform;

receiving an instruction to change the printing setting for the page on which printing processing is impossible to perform; and outputting the printing data of the page on which printing processing is impossible to perform according to the printing setting that is changed based on the received instruction.

15. An image forming apparatus, comprising a processor configured to:

receive an instruction from a user, if printing data includes a page on which printing processing by the image forming apparatus is possible to perform and a page on which printing processing by the image forming apparatus is impossible to perform, wherein the instruction includes a change of a printing setting of the page on which printing processing by the image forming apparatus is impossible to perform, enabling the image forming apparatus to perform printing processing according to the changed printing setting; and output a corrected printing data of the page on which printing processing by the image forming apparatus is impossible to perform, the corrected printing data being changed according to the change by the user so that all pages included in the printing data are enabled to be printed according to the printing setting set by the user.

* * * * *